United States Patent Office 3,360,542
Patented Dec. 26, 1967

3,360,542
TRIFLUOROMETHYL-AMINO-SULFENYL HALIDES
Engelbert Kühle, Cologne-Stammheim, and Erich Klauke, Cologne-Flittard, Germany, assignors to Farbenfabriken Bayer Aktiengesellschaft, Leverkusen, Germany, a corporation of Germany
No Drawing. Filed Oct. 29, 1963, Ser. No. 319,691
Claims priority, application Germany, Dec. 10, 1962,
F 38,508
4 Claims. (Cl. 260—470)

The present invention relates to new N-aryl-N-trifluoromethylsulphenic acid halides and to a process for their production.

The only amine sulphenic acid halides that have hitherto become known are the amine sulphenic acid chlorides and bromides of strong secondary aliphatic, cycloaliphatic and heterocyclic amines. N-aryl-N-trifluoromethylsulphenic acid halides have not so far been described.

It has now been found that N-(dithio-bis)-trifluoromethyl-arylamines can be split up with chlorine or bromine or compounds which split off chlorine or bromine to form N-aryl-N-trifluoromethylsulphenic acid halides according to the equation $$\underset{\underset{CF_3}{|}}{Ar-N}-S-S-\underset{\underset{CF_3}{|}}{N-Ar} \longrightarrow 2\,\underset{\underset{CF_3}{|}}{Ar-N}-S-X$$

In this general formula, Ar is an aryl radical, e.g., a phenyl radical, which may or may not be substituted by halogen, nitro, alkyl, e.g., lower alkyl, aryl, e.g., phenyl, alkoxy, e.g., lower alkoxy or carbalkoxy radicals, and X is chlorine or bromine.

The N-(dithio-bis) - trifluoromethylarylamines which can be used as starting materials may be produced from N-trifluoromethyl-arylamines and disulphur dichloride, e.g., from 2 mols N-trifluoromethyl - 4 - chloroaniline and 1 mol disulphuryl dichloride in the presence of a tertiary base in an inert solvent, for example as described in Belgian patent specification No. 620,622:

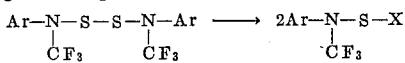

N-(dithio-bis)-trifluoromethylarylamines suitable for the process according to the invention are, for example, the N-dithio-bis-compounds of N-trifluoromethyl-aniline, -4-chloroaniline, -2 - chloroaniline, -2:4-dichloroaniline, -pentachloro-aniline, -4-nitroaniline, -2-methyl - 5 - nitroaniline, -4-carboethoxy-aniline, -2-methoxy - 4 - nitroaniline, -2-aminodiphenyl, -1-naphthylamine and other compounds.

The reaction is generally carried out in an inert solvent such as carbon tetrachloride, benzene, chlorobenzenes, etc., at temperatures between 0 and 50° C., preferably between 0 and 30° C. by adding the halogen or the substance splitting off halogen to the reaction solution. Suitable substances which split off chlorine or bromine are sulphuryl chloride and sulphuryl bromide.

The sulphenic halides according to the invention may generally be removed from the reaction mixture by distillation and purified. They may be used for the production of rubber auxiliary products, e.g., for the production of corresponding sulphenic amides which are suitable as vulcanisation accelerators; however, they may also be used for the production of dyestuffs.

They may further be used for the production of insecticides and acaricides. The compounds of the invention may be reacted with compounds containing hydroxyl or sulfhydryl groups to form the following insecticidal and acaricidal compounds. These compounds were used in 0.2% solutions against drosophila and spider mites.

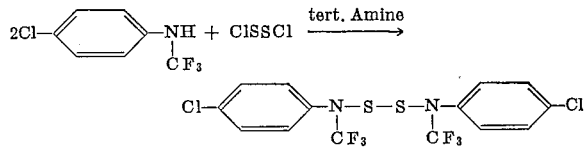

| Compound | Percent drosophila killed | Percent spider mites killed |
|---|---|---|
| (4-Cl-C6H4)-N(CF3)-S-S-CONHC6H5 | 100 | 95 |
| (4-Cl-C6H4)-N(CF3)-S-S-CONHCH3 | 100 | 100 |
| (2,4-Cl2-C6H3)-N(CF3)-S-OCH3 | 100 | 90 |
| (4-Cl-C6H4)-N(CF3)-S-S-CH2-C6H4-Cl | 90 | 100 |
| Cl-C6H4-N(CF3)-S-S-C(=S)OC2H5 | 100 | 100 |

Example 1

98 g. of N-trifluoromethyl - 4 - chloroaniline are dissolved in 500 ml. carbon tetrachloride and treated at 15 to 20° C. with 50.5 g. triethylamine. 33.4 g. disulphuryl dichloride is then added dropwise into this solution with cooling, at a maximum temperature of 25° C., and the mixture is thereafter stirred for some time and the precipitated triethylamino hydrochloride is removed by suction filtration, and 25 g. chlorine is led in to the clear filtrate with cooling with ice at 5 to 10° C. The dark solution is made lighter by this treatment. After distilling off the solvent, 76 g. N-trifluoromethyl-N-(4 - chlorophenyl) amino-sulphenyl chloride of B.P.$_{10\,mm.}$ 95–100° C. are then obtained by vacuum distillation. Analogously the following compounds are obtained:

| Compound | B.P. |
|---|---|
| (4-Cl-C6H4)-N(CF3)-SCl | B.P.$_{13\,mm.}$ 93–99° C. |
| (4-H5C2OOC-C6H4)-N(CF3)-SCl | B.P.$_{13\,mm.}$ 146–150° C. |
| (2,4-Cl2-C6H3)-N(CF3)-SCl | B.P.$_{12\,mm.}$ 138–145° C. |
| (4-O2N-C6H4)-N(CF3)-SCl | B.P.$_{0.7\,mm.}$ 120–125° C. |
| (2,3-Cl2-C6H3)-N(CF3)-SCl | B.P.$_{10\,mm.}$ 114–122° C. |

Example 2

19 g. N-trifluoromethyl - 2:4 - dichloroaniline are dissolved in 100 ml. benzene, and 5.6 g. di-sulphuryl dichloride are added dropwise after the addition of 8.5 g. triethylamine at 20 to 25° C. The reaction mixture is then stirred and the tertiary amine salt is removed by suction filtration and 8 g. chlorine are passed into the filtrate at 15 to 20° C. 19 g. N-trifluoromethyl-N-(2:4 - dichlorophenyl)amino-sulphenyl chloride, B.P.$_{10\ mm.}$ 110–115° C. are obtained by vacuum distillation.

Example 3

138 g. 2:5 - dichloro-N-trifluoromethylaniline are dissolved in 500 ml. carbon tetrachloride with the addition of 41 g. di-sulphuryl dichloride. The solution of 66 g. triethylamine in 100 ml. carbon tetrachloride is added, with cooling, and the temperature should not exceed 25°. The amine salt is filtered off by suction and the filtrate is divided into two halves.

(a) The first half of the carbon tetrachloride solution is treated with 30 g. chlorine and at the same time cooled below 10° with ice. After stirring for a short time, the solvent is distilled off and the residue (82 g.) is distilled in vacuo. 65 g. N-trifluoromethyl-N-(2:5-dichlorophenyl) amino-sulphenyl chloride, B.P.$_{12\ mm.}$ 114–122°, are obtained.

(b) The second half of the carbon tetrachloride solution is treated dropwise with 45 g. sulphuryl chloride at a temperature below 10°. After working up in the usual manner, 11 g. of the sulphenyl chloride of B.P.$_{13\ mm.}$ 115 to 123° are obtained.

Example 4

34.5 g. of 2:5 - dichloro-N-trifluoromethylaniline are treated in carbon tetrachloride solution with sulphuryl dichloride and triethylamine as described in Example 3. 12 g. bromine are then added dropwise into 20 ml. carbon tetrachloride, the mixture is stirred for 3 hours at 40–50° and concentrated by evaporation in vacuo, and the oily residue is distilled. 15 g. N-trifluoromethyl-N-(2:5-dichlorophenyl)amino-sulphenyl bromide, B.P.$_{14\ mm.}$ 125–130°, are obtained.

We claim:

1. N-trifluoromethyl-N-phenyl-amino-sulphenyl halides of the formula

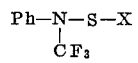

wherein Ph is a member of the group consisting of a phenyl, a nitrophenyl, a halogenophenyl, an alkylphenyl, an alkoxyphenyl and a carbalkoxyphenyl radical and X is a member of the group consisting of chlorine and bromine.

2. N-trifluoromethyl - N-(4 - chlorophenyl)-amino-sulphenyl chloride.
3. N-trifluoromethyl-N-(4 - carbalkoxyphenyl)-amino-sulphenyl chloride.
4. N-trifluoromethyl - N-(4 - nitrophenyl)-amino-sulphenyl chloride.

References Cited

FOREIGN PATENTS 790,021   1/1958   Great Britain.

OTHER REFERENCES

Petrov: Journal of General Chemistry, U.S.S.R. (English translation), vol. 29, pp. 2135–39 (1959).

LORRAINE A. WEINBERGER, *Primary Examiner.*

H. C. WEGNER, *Assistant Examiner.*